United States Patent
Sun et al.

(10) Patent No.: US 10,992,345 B2
(45) Date of Patent: Apr. 27, 2021

(54) METHOD FOR LOW VOLTAGE BROADBAND POWER LINE CARRIER COMMUNICATION

(71) Applicant: Wu Qi Technologies, Inc., Chongqing (CN)

(72) Inventors: Songsong Sun, Chongqing (CN); Ren Wei, Chongqing (CN); Qiang Gu, Chongqing (CN); Hongbing Li, Chongqing (CN); Bairu Chen, Chongqing (CN); Anhui Zeng, Chongqing (CN)

(73) Assignee: WU QI TECHNOLOGIES, INC., Yubei District ( * ) Notice: Subject to any disclaimer, the term of this patent is extended or adjusted under 35 U.S.C. 154(b) by 0 days.

(21) Appl. No.: 16/623,271

(22) PCT Filed: Mar. 19, 2018

(86) PCT No.: PCT/CN2018/079428
§ 371 (c)(1),
(2) Date: Dec. 16, 2019

(87) PCT Pub. No.: WO2019/015349
PCT Pub. Date: Jan. 24, 2019

(65) Prior Publication Data
US 2020/0186195 A1 Jun. 11, 2020

(30) Foreign Application Priority Data
Jul. 20, 2017 (CN) .......................... 201710595937.1

(51) Int. Cl.
*H04B 3/54* (2006.01)
*H04L 5/00* (2006.01)
*H04L 25/02* (2006.01)

(52) U.S. Cl.
CPC ........... *H04B 3/542* (2013.01); *H04L 5/0044* (2013.01); *H04L 5/0048* (2013.01); *H04L 25/0202* (2013.01)

(58) Field of Classification Search
CPC ........... H04B 3/542; H04L 2027/0026; H04L 25/0202; H04L 25/0226; H04L 27/0014;
(Continued)

(56) References Cited

U.S. PATENT DOCUMENTS 7,519,128 B2    4/2009   Seto et al.
9,548,844 B2    1/2017   Chen
(Continued)

FOREIGN PATENT DOCUMENTS

CN    102361465 A     2/2012
CN    103988454 A     8/2014
WO    2016/160528 A1  10/2016

OTHER PUBLICATIONS

International Search Report Issued in Counterpart PCT Application No. PCT/CN2018/079428.

*Primary Examiner* — David S Huang
(74) *Attorney, Agent, or Firm* — Amster, Rothstein & Ebenstein LLP

(57) ABSTRACT

Disclosed is a method for low voltage broadband power line carrier communication; when transmitting a physical layer protocol frame, short preambles are first transmitted to undergo automatic gain control, channel estimation, coarse-grained frequency offset compensation, and symbol synchronization; and then long preambles are transmitted to undergo automatic gain control, channel estimation, fine-grained frequency offset compensation, and symbol synchronization. Compared with the scheme of only transmitting long preambles, the present disclosure combines transmissions of short preambles and long preambles, which thus may quickly and accurately implement frequency offset
(Continued)

compensation, automatic gain control, symbol synchronization, and channel estimation without sacrifice of precision, thereby achieving quick convergence, reducing resource overheads and time overheads, and enhancing system performance.

5 Claims, 3 Drawing Sheets

(58) Field of Classification Search
CPC .............. H04L 27/2613; H04L 27/2647; H04L 27/2663; H04L 27/2665; H04L 5/0007; H04L 5/0044; H04L 5/0048
See application file for complete search history.

(56) References Cited

U.S. PATENT DOCUMENTS

| | | | |
|---|---|---|---|
| 2008/0089443 A1* | 4/2008 | Sanada | H04L 27/2657 375/319 |
| 2008/0240143 A1* | 10/2008 | Koga | H04L 12/413 370/445 |
| 2009/0268602 A1* | 10/2009 | Han | H04W 56/001 370/208 |
| 2010/0067590 A1 | 3/2010 | Walton et al. | |
| 2014/0160915 A1* | 6/2014 | Chen | H04L 5/0048 370/206 |
| 2016/0248555 A1 | 8/2016 | Lei et al. | |

* cited by examiner

METHOD FOR LOW VOLTAGE BROADBAND POWER LINE CARRIER COMMUNICATION

CROSS-REFERENCE TO RELATED APPLICATIONS

The present application is a National Stage entry under 35 U.S.C.371 of International Patent Application No. PCT/CN2018/079428, filed on Mar. 19, 2018, which claims priority from Chinese Patent Application No. CN 201710595937.1, filed Jul. 20, 2017, the entire contents of each of which are incorporated by reference herein.

FIELD

The present disclosure relates to digital communications technologies, and more particularly relates to a method for low voltage broadband power line carrier communication.

BACKGROUND

As specified in the LVPLC (Low Voltage Broadband Power Line Carrier Communication) protocol of the State Grid, the physical layer (PHY) frame format includes a long preamble, a frame control, and a data payload, wherein the long preamble is for frequency offset compensation, automatic gain control, symbol synchronization and channel estimation. A long preamble-trained receiving system trained has an improved symbol synchronization property and frequency synchronization property, which may adjust voltage gains and estimate channel characteristics more accurately, thereby improving receiver performance. However, a certain number of long preambles take up a large portion of bandwidth and system processing overhead, resulting in a relatively large resource overhead and time overhead for the system to implement frequency offset compensation, automatic gain control, symbol synchronization and channel estimation.

SUMMARY

The present disclosure provides a method for low voltage broadband power line carrier communication, which may quickly and accurately implement frequency offset compensation, automatic gain control, symbol synchronization, and channel estimation without sacrificing precision, thereby achieving quick convergence, reducing resource overheads and time overheads, and enhancing system performance.

To achieve the objective above, the method for low voltage broadband power line carrier communication according to the present disclosure comprises: modulating and transmitting, by a transmitter, a physical layer protocol frame; and receiving and processing, by a receiver, the physical layer protocol frame;

wherein the physical layer protocol frame includes: a plurality of short preambles, a plurality of long preambles, a plurality of frame control symbols, and a plurality of data payload symbols;

the modulating the physical layer protocol frame comprises steps of:

selecting a plurality of sub-carriers according to a fixed frequency interval to transmit the short preambles; and transmitting, using all available sub-carriers, the long preambles, the frame control symbols, and the data payload symbols.

The receiving and processing the physical layer protocol frame comprises steps of:

Step S1: performing, by the receiver, direct-current (DC) estimation, automatic gain control, frequency offset compensation, symbol synchronization, and channel estimation with respect to the short preambles and long preambles received;

Step S2: processing, by the receiver, the frame control symbols and the data payload symbols after obtaining accurate channel information based on the outcomes from step S1 to obtain correct data;

wherein processing the short preambles and long preambles in the physical layer protocol frame specifically comprises steps of:

Step S1.1: analog gain adjustment, wherein an analog gain module adjusts gain of the received analog signal;

Step S1.2: analog-to-digital conversion, wherein an analog-to-digital conversion module performs analog-to-digital conversion to the received short preambles or long preambles to produce a digital sampling signal for the short preambles or long preambles of time domain;

Step S1.3: automatic gain control, wherein an automatic gain control module performs energy estimation on the digital sampling signal for the short preambles or long preambles to obtain an energy gain parameter, the energy gain parameter acting on the analog gain module to implement energy gain coefficient adjustment;

Step S1.4: direct-current estimation, wherein a direct-current estimation module performs direct-current estimation on the digital sampling signal for the short preamble or long preamble to obtain a time-domain signal;

Step S1.5: frequency offset compensation, wherein a frequency offset compensation module performs coarse-grained frequency offset compensation for the short preambles or performs fine-grained frequency offset compensation for the long preambles;

Step S1.6: symbol synchronization, wherein a symbol synchronization module performs coarse-grained autocorrelation processing to the short preambles or performs fine-grained autocorrelation processing for the long preambles, thereby implementing symbol synchronization;

Step S1.7: fast Fourier transform, wherein a fast Fourier transform module performs fast Fourier transform to the short preambles and the long preambles and then converts the fast Fourier transformed short preambles and the fast Fourier transformed long preambles from time domain to frequency domain;

Step S1.8: channel estimation, wherein a channel estimation module performs channel estimation to the short preambles or the long preambles to obtain an estimated preamble value.

The automatic gain control comprises steps of:

Step S1.2.1: preamble detection, wherein if the short preambles or the long preambles are detected, a counter is started;

Step S1.2.2: counting, by a counter, the short preambles or the long preambles, and computing energies thereof;

Step S1.2.3: comparing, by a comparer, short preamble energy or long preamble energy with a system set threshold, wherein the outputted energy gain parameter acts on the analog gain module to perform adjustment energy for subsequent reception;

if energy<lower threshold, the outputted energy gain parameter is a positive value;

if energy> higher threshold, the outputted energy gain parameter is a negative value.

The frequency offset compensation comprises steps:

Step S1.4.1: determining preamble type; in the case of short preambles, simultaneously performing step S1.4.2 and step S1.4.4; in the case of long preambles, simultaneously performing step S1.4.3 and step S1.4.4;

Step S1.4.2: performing coarse-grained frequency offset compensation for the short preambles, and performing step S1.4.5;

Step S1.4.3: performing fine-grained frequency offset compensation for the long preambles, and then performing step S1.4.5;

Step S1.4.4: caching the short preambles and the long preambles for superimposing the outcomes of frequency offset compensation, and then performing step S1.4.5;

Step S1.4.5: performing frequency offset compensation;

Step S1.4.6: outputting the compensated data to the symbol synchronization module.

The symbol synchronization comprises steps of:

Step S1.5.1: determining preamble type; in the case of short preambles, simultaneously performing step S1.5.2 and step S1.5.4; in the case of long preambles, simultaneously performing step S1.5.3 and step S1.5.4;

Step S1.5.2: performing coarse-grained autocorrelation processing to the short preambles so as to quickly perform symbol synchronization with a relatively large step, and then performing step S1.5.5;

Step S1.5.3: performing fine-grained autocorrelation processing to the long preambles so as to perform refined symbol synchronization with a relatively small step, and then performing step S1.5.5;

Step S1.5.4: caching the short preamble and the long preamble for symbol synchronization, and then performing step S1.5.5;

Step S1.5.5: superimposing outcomes of symbol synchronization.

The channel estimation comprises steps of:

Step S1.7.1: determining preamble type; in the case of short preambles, performing step S1.7.2; in the case of long preambles, performing step S1.7.4;

Step S1.7.2: performing channel interpolation to the short preambles to obtain spectra of all available sub-carriers, and performing step S1.7.3;

Step S1.7.3: performing interpolation and filtering to the short preambles to smooth the spectra, and then performing step S1.7.4;

Step S1.7.4: performing channel filtering to the short preambles or long preambles and then performing step S1.7.5;

Step S1.7.5: performing phase estimation to the short preambles or the long preambles to obtain an estimated preamble value.

In the present disclosure, when transmitting a physical layer protocol frame, short preambles are first transmitted to undergo automatic gain control, channel estimation, coarse-grained frequency offset compensation, and symbol synchronization; and then long preambles are transmitted to undergo automatic gain control, channel estimation, fine-grained frequency offset compensation, and symbol synchronization. Compared with the scheme of only transmitting long preambles, the present disclosure combines transmissions of short preambles and long preambles, which thus may quickly and accurately implement frequency offset compensation, automatic gain control, symbol synchronization, and channel estimation without sacrifice of precision, thereby achieving quick convergence, reducing resource overheads and time overheads, and enhancing system performance.

DETAILED DESCRIPTION OF EMBODIMENTS

Hereinafter, the preferred embodiments of the present disclosure will be illustrated in detail with reference to FIGS. 1-8.

The present disclosure is applicable to the low voltage broadband power line carrier communication network of the State Grid and is also applicable to communications systems satisfying other standards for low voltage broadband power line carrier communication systems.

The method for low voltage broadband power line carrier communication according to the present disclosure comprises: modulating and transmitting, by a transmitter, a physical layer protocol frame; and receiving and processing, by a receiver, the physical layer protocol frame.

Figure 1:
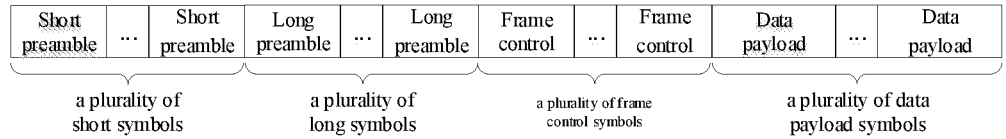
FIG. 1 is a structural schematic diagram of a physical layer protocol frame provided according to the present disclosure.

As shown in FIG. 1, the physical layer protocol frame includes: a plurality of short preambles, a plurality of long preambles, a plurality of frame control symbols, and a plurality of data payload symbols.

Particularly, a short preamble refers to a segment of known sequence, which occupies specific sub-carriers of a carrier band with a fixed frequency interval; a long preamble refers to a segment of known sequence, which occupies all available sub-carriers of the carrier band; a frame control symbol includes control information of a frame, which occupies all available sub-carriers of the carrier band; and a data payload symbol includes valid data of the frame, which occupies all available sub-carriers of the carrier band.

The modulating the physical layer protocol frame comprises steps of:

selecting a plurality of sub-carriers according to a fixed frequency interval to transmit the short preambles; and transmitting, using all available sub-carriers, the long preambles, the frame control symbols, and the data payload symbols.

Figure 2:
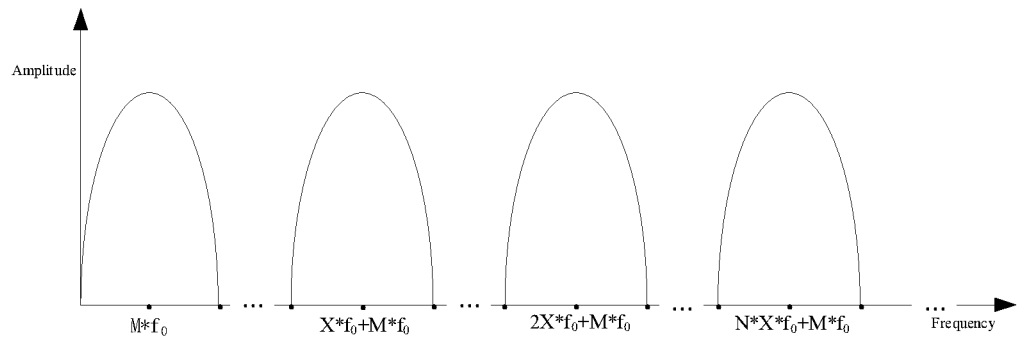
FIG. 2 is a sub-carrier modulation spectrum for short preambles.

As shown in FIG. 2, when the short preambles are modulated, the initial sub-carrier frequency point $M*f_0$ is first selected; then, corresponding sub-carrier frequency points are selected with $X*f_0$ as a frequency interval; if the size of the short preamble is N+1, a group of sub-carriers $\{M*f_0, X*f_0+M*f_0, 2X*f_0+M*f_0, \ldots, N*X*f_0+M*f_0\}$ are selected to transmit the short preambles, wherein $f_0$ denotes the fundamental frequency, N, X, and M are all natural numbers.

Figure 3:
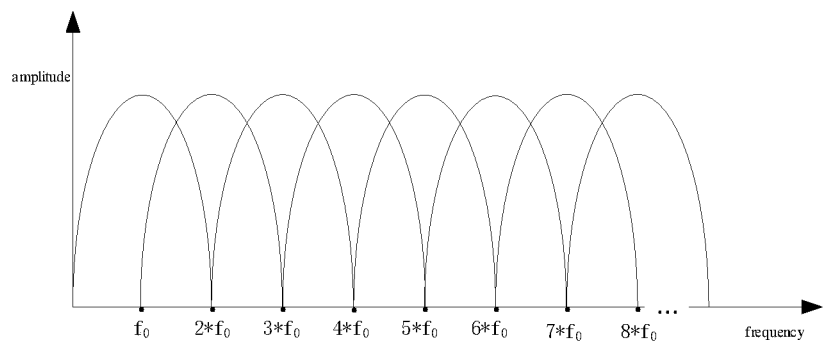
FIG. 3 is a sub-carrier modulation spectrum for long preambles/frame control symbols/data payload symbols.

As shown in FIG. 3, $f_0$ denotes the fundamental frequency, and the carrier bands for modulating the long preambles, the frame control symbols, and the data payload symbols are all available carrier bands. In actual use, if a certain sub-carrier is unavailable, the sub-carrier is not in the list of all available sub-carriers. It needs to be noted that the carrier bands for modulating short preambles are a subset of carrier bands for modulating long preambles.

Figure 4:
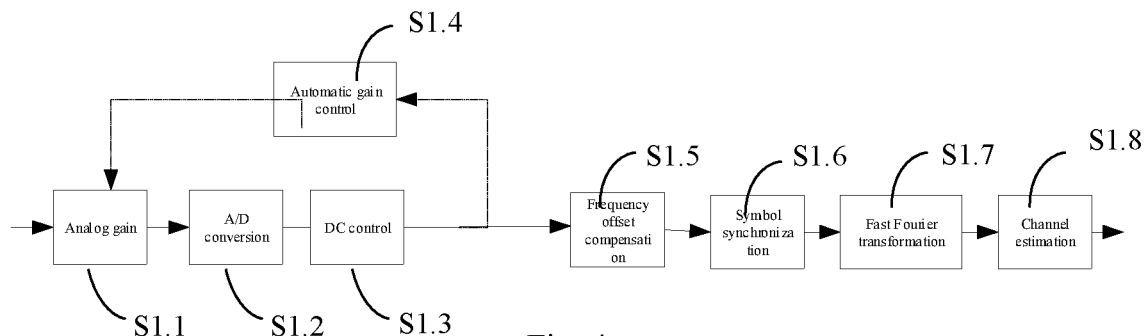
FIG. 4 is a flow diagram of a method for processing short preambles and long preambles in the physical layer protocol frame.

The receiving and processing the physical layer protocol frame comprises steps of:

Step S1: performing, by the receiver, direct-current estimation, automatic gain control, frequency offset compensation, symbol synchronization, and channel estimation with respect to the short preambles and long preambles received;

Step S2: processing, by the receiver, the frame control symbols and the data payload symbols after obtaining accurate channel information based on the outcomes from step S1 to obtain correct data;

wherein, as shown in FIG. 4, the processing the short preambles and long preambles in the physical layer protocol frame specifically comprises steps of:

Step S1.1: analog gain adjustment, wherein an analog gain module adjusts gain of the received analog signal;

Step S1.2: analog-to-digital conversion, wherein an analog-to-digital conversion module performs analog-to-digital conversion to the received short preambles or long preambles to produce a digital sampling signal for short preambles or long preambles of time domain;

Step S1.3: automatic gain control, wherein an automatic gain control module performs energy estimation on the digital sampling signal for the short preambles or long preambles to obtain an energy gain parameter, the energy gain parameter acting on the analog gain module to implement energy gain coefficient adjustment;

Step S1.4: direct-current estimation, wherein a direct-current estimation module performs direct-current estimation on the digital sampling signal for the short preambles or long preambles to obtain a time-domain signal;

Step S1.5: frequency offset compensation, wherein a frequency offset compensation module performs coarse-grained frequency offset compensation for the short preambles or performs fine-grained frequency offset compensation for the long preambles;

Step S1.6: symbol synchronization, wherein a symbol synchronization module performs coarse-grained autocorrelation processing to the short preambles or performs fine-grained autocorrelation processing for the long preambles, thereby implementing symbol synchronization;

Step S1.7: fast Fourier transform, wherein a fast Fourier transform module performs fast Fourier transform to the short preambles and the long preambles and then converts the fast Fourier transformed short preambles and the fast Fourier transformed long preambles from time domain to frequency domain;

Step S1.8: channel estimation, wherein a channel estimation module performs channel estimation to the short preambles or the long preambles to obtain an estimated preamble value.

Figure 5:
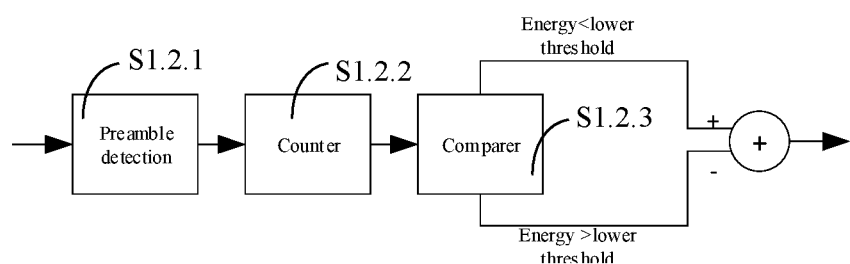
FIG. 5 is a flow diagram of automatic gain control.

As shown in FIG. 5, the automatic gain control comprises steps of:

Step S1.2.1: preamble detection, wherein if the short preambles or the long preambles are detected, a counter is started;

Step S1.2.2: counting, by a counter, the short preambles or the long preambles, and computing energies thereof;

Step S1.2.3: comparing, by a comparer, short preamble energy or long preamble energy with a system set threshold, wherein the outputted energy gain parameter acts on the analog gain module to perform adjustment energy for subsequent reception;

if energy<lower threshold, the outputted energy gain parameter is a positive value; if energy> higher threshold, the outputted energy gain parameter is a negative value.

Through multiple times of automatic gain control, energy gain coefficient adjustment may be implemented quickly and accurately.

Figure 6:
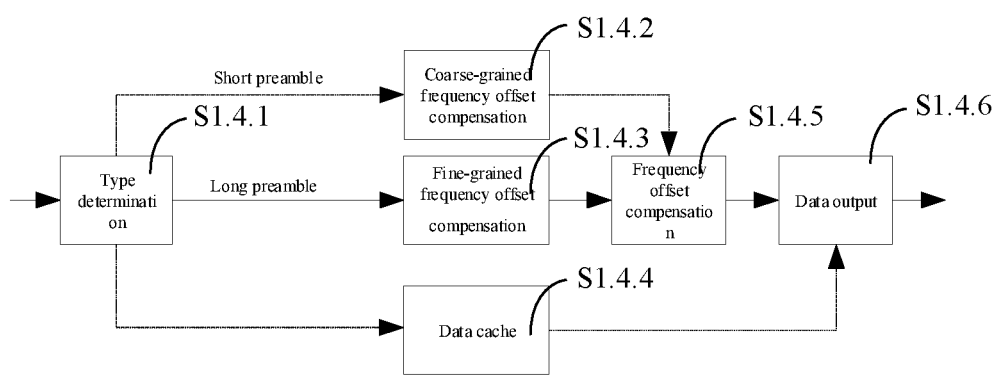
FIG. 6 is a flow diagram of frequency offset compensation.

As shown in FIG. 6, the frequency offset compensation comprises steps:

Step S1.4.1: determining preamble type; in the case of short preambles, simultaneously performing step S1.4.2 and step S1.4.4; in the case of long preambles, simultaneously performing step S1.4.3 and step S1.4.4;

Step S1.4.2: performing coarse-grained frequency offset compensation for the short preambles, and performing step S1.4.5;

based on the short preamble sub-carrier modulation spectrum shown in FIG. 2, the coarse-grained frequency offset compensation may adjust the $X^*f_0$ frequency offset to the utmost extent, and the coarse-grained frequency offset compensation may adjust the frequency till surrounding the subcarrier center frequency point quickly with a relatively large step;

Step S1.4.3: performing fine-grained frequency offset compensation for the long preambles, and then performing step S1.4.5;

based on the subcarrier modulated spectra for long preambles shown in FIG. 3, the fine grain may further narrow down the offset between the to-be-estimated frequency points and the central frequency point, thereby improving precision of frequency offset compensation;

Step S1.4.4: caching the short preambles and the long preambles for superimposing the outcomes of frequency offset compensation, and then performing step S1.4.5;

Step S1.4.5: performing frequency offset compensation;

Step S1.4.6: outputting the compensated data to the symbol synchronization module.

Through multiple times of frequency offset compensation, the frequency offset compensation may be implemented quickly and accurately.

Figure 7:
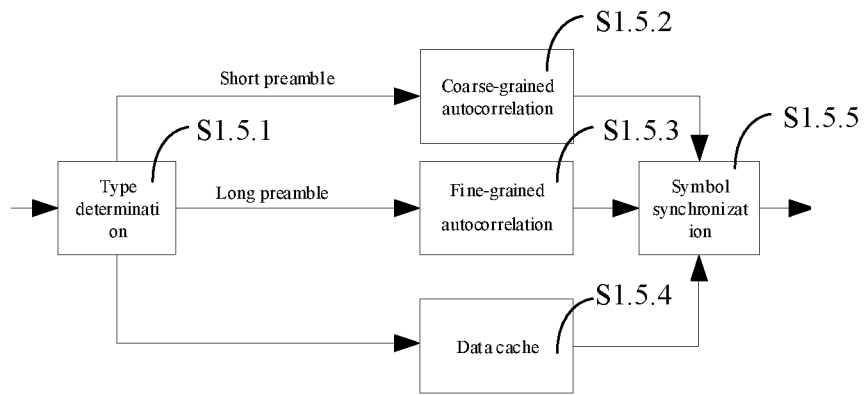
FIG. 7 is a flow diagram of symbol synchronization.

As shown in FIG. 7, the symbol synchronization comprises steps of:

Step S1.5.1: determining preamble type; in the case of short preambles, simultaneously performing step S1.5.2 and step S1.5.4; in the case of long preambles, simultaneously performing step S1.5.3 and step S1.5.4;

Step S1.5.2: performing coarse-grained autocorrelation processing to the short preambles so as to quickly perform symbol synchronization with a relatively large step, and then performing step S1.5.5;

Step S1.5.3: performing fine-grained autocorrelation processing to the long preambles so as to perform refined symbol synchronization with a relatively small step, and then performing step S1.5.5;

Step S1.5.4: caching the short preamble and the long preamble for symbol synchronization, and then performing step S1.5.5;

Step S1.5.5: superimposing outcomes of symbol synchronization.

Through multiple times of coarse/fine-grained symbol synchronization, symbol synchronization timing may be implemented quickly and accurately.

Figure 8:
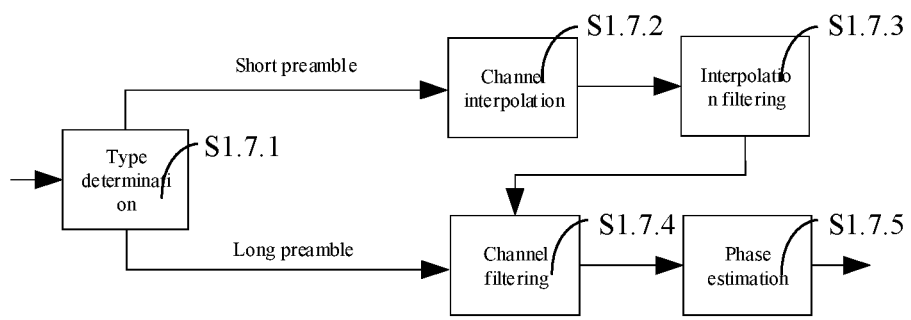
FIG. 8 is a flow diagram of channel estimation.

As shown in FIG. 8, the channel estimation comprises steps of:

Step S1.7.1: determining preamble type; in the case of short preambles, performing step S1.7.2; in the case of long preambles, performing step S1.7.4;

Step S1.7.2: performing channel interpolation to the short preambles to obtain spectra of all available sub-carriers, and performing step S1.7.3;

Step S1.7.3: performing interpolation and filtering to the short preambles to smooth the spectra, and then performing step S1.7.4;

Step S1.7.4: performing channel filtering to the short preambles or long preambles and then performing step S1.7.5;

Step S1.7.5: performing phase estimation to the short preambles or the long preambles to obtain an estimated preamble value.

The estimated value derived from channel estimation will be used in processing frame control symbols and data payload symbols.

In the present disclosure, when transmitting a physical layer protocol frame, short preambles (SP) are first transmitted to undergo automatic gain control, channel estimation, coarse-grained frequency offset compensation, and symbol synchronization; and then long preambles (LP) are transmitted to undergo automatic gain control, channel estimation, fine-grained frequency offset compensation, and symbol synchronization. Compared with the scheme of only transmitting long preambles, the present disclosure combines transmissions of short preambles and long preambles, which thus may quickly and accurately implement frequency offset compensation, automatic gain control, symbol synchronization, and channel estimation without sacrifice of precision, thereby achieving quick convergence, reducing resource overheads and time overheads, and enhancing system performance.

Although the contents of the present disclosure have been described in detail through the foregoing preferred embodiments, it is noted that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

We claim:

1. A method for low voltage broadband power line carrier communication, comprising:
   modulating and transmitting, by a transmitter, a physical layer protocol frame; and
   receiving and processing, by a receiver, the physical layer protocol frame;
   wherein the physical layer protocol frame includes:
      a plurality of short preambles,
      a plurality of long preambles,
      a plurality of frame control symbols, and
      a plurality of data payload symbols;
   the modulating the physical layer protocol frame comprises steps of:
      selecting a plurality of sub-carriers according to a fixed frequency interval to transmit the short preambles; and
      transmitting, using all available sub-carriers, the long preambles, the frame control symbols, and the data payload symbols;
   wherein the receiving and processing the physical layer protocol frame includes steps of:
      Step S1: performing, by the receiver, direct-current estimation, automatic gain control, frequency offset compensation, symbol synchronization, and channel estimation with respect to the short preambles and long preambles received;
      Step S2: processing, by the receiver, the frame control symbols and the data payload symbols after obtaining accurate channel information based on the outcomes from step S1 to obtain correct data; and
   wherein the processing the short preambles and long preambles in the physical layer protocol frame specifically includes steps of:
      Step S1.1: analog gain adjustment, wherein an analog gain module adjusts gain of the received analog signal;
      Step S1.2: analog-to-digital conversion, wherein an analog-to-digital conversion module performs analog-to-digital conversion to the received short preambles or long preambles to produce a time-domain short preamble or long preamble digital sampling signal;
      Step S1.3: automatic gain control, wherein an automatic gain control module performs energy estimation on the short preamble or long preamble digital sampling signal to obtain an energy gain parameter, the energy gain parameter acting on the analog gain module to implement energy gain coefficient adjustment;
      Step S1.4: direct-current estimation, wherein a direct-current estimation module performs direct-current estimation on the short preamble or long preamble digital sampling signal to obtain a time-domain signal;
      Step S1.5: frequency offset compensation, wherein a frequency offset compensation module performs coarse-grained frequency offset compensation for the short preambles or performs fine-grained frequency offset compensation for the long preambles;
      Step S1.6: symbol synchronization, wherein a symbol synchronization module performs coarse-grained autocorrelation processing to the short preambles or performs fine-grained autocorrelation processing for the long preambles, thereby implementing symbol synchronization;
      Step S1.7: fast Fourier transformation, wherein a fast Fourier transformation module performs fast Fourier transformation to the short preambles and the long preambles and then converts the fast Fourier transformed short preambles and the fast Fourier transformed long preambles from time domain to frequency domain;
      Step S1.8: channel estimation, wherein a channel estimation module performs channel estimation to the short preambles or the long preambles to obtain an estimated preamble value.

2. The method for low voltage broadband power line carrier communication according to claim 1, wherein the automatic gain control comprises steps of:
   Step S1.2.1: preamble detection, wherein if the short preambles or the long preambles are detected, a counter is started;
   Step S1.2.2: counting, by a counter, the short preambles or the long preambles, and computing energies thereof;
   Step S1.2.3: comparing, by a comparer, short preamble energy or long preamble energy with a system set threshold, wherein the outputted energy gain parameter acts on the analog gain module to perform adjustment energy for subsequent reception;
   if energy <lower threshold, the outputted energy gain parameter is a positive value; if energy > higher threshold, the outputted energy gain parameter is a negative value.

3. The method for low voltage broadband power line carrier communication according to claim 2, wherein the frequency offset compensation comprises steps of:

Step S1.4.1: determining preamble type; in the case of short preambles, simultaneously performing step S1.4.2 and step S1.4.4; in the case of long preambles, simultaneously performing step S1.4.3 and step S1.4.4;

Step S1.4.2: performing coarse-grained frequency offset compensation for the short preambles, and performing step S1.4.5;

Step S1.4.3: performing fine-grained frequency offset compensation for the long preambles, and then performing step S1.4.5;

Step S1.4.4: caching the short preambles and the long preambles for superimposing the outcomes of frequency offset compensation, and then performing step S1.4.5;

Step S1.4.5: performing frequency offset compensation;

Step S1.4.6: outputting the compensated data to the symbol synchronization module.

4. The method for low voltage broadband power line carrier communication according to claim 3, wherein the symbol synchronization comprises steps of:

Step S1.5.1: determining preamble type; in the case of short preambles, simultaneously performing step S1.5.2 and step S1.5.4; in the case of long preambles, simultaneously performing step S1.5.3 and step S1.5.4;

Step S1.5.2: performing coarse-grained autocorrelation processing to the short preambles so as to quickly perform symbol synchronization with a relatively large step, and then performing step S1.5.5;

Step S1.5.3: performing fine-grained autocorrelation processing to the long preambles so as to perform refined symbol synchronization with a relatively small step, and then performing step S1.5.5;

Step S1.5.4: caching the short preamble and the long preamble for symbol synchronization, and then performing step S1.5.5;

Step S1.5.5: superimposing outcomes of symbol synchronization.

5. The method for low voltage broadband power line carrier communication according to claim 4, wherein the channel estimation comprises steps of:

Step S1.7.1: determining preamble type; in the case of short preambles, performing step S1.7.2; in the case of long preambles, performing step S1.7.4;

Step S1.7.2: performing channel interpolation to the short preambles to obtain spectra of all available sub-carriers, and performing step S1.7.3;

Step S1.7.3: performing interpolation filtering to the short preambles to smooth the spectra, and then performing step S1.7.4;

Step S1.7.4: performing channel filtering to the short preambles or long preambles and then performing step S1.7.5;

Step S1.7.5: performing phase estimation to the short preambles or the long preambles to obtain an estimated preamble value.

\* \* \* \* \*